Nov. 18, 1969 J. F. KEIDEL 3,479,519

PHOTOELECTRIC CODE READING APPARATUS ENABLING
IN-USE FOCUSING AND POSITIONING
Filed Oct. 27, 1965

INVENTOR.
JOHN F. KEIDEL
BY Alfred Stapler
ATTORNEY

United States Patent Office 3,479,519
Patented Nov. 18, 1969

3,479,519

PHOTOELECTRIC CODE READING APPARATUS ENABLING IN-USE FOCUSING AND POSITIONING

John F. Keidel, Colwyn, Pa., assignor to General Atronics Corporation, Wyndmoor, Pa., a corporation of Pennsylvania Filed Oct. 27, 1965, Ser. No. 505,326
Int. Cl. G01n *21/30*
U.S. Cl. 250—219 7 Claims

ABSTRACT OF THE DISCLOSURE

Accurate positioning of the photoelectric sensors employed for bar code reading is facilitated by mounting these sensors in a supporting material which is light transmissive and also, at least in part, light diffusing. An image of the bar code pattern is focused on this diffusing supporting surface, thereby permitting viewing of the bar code pattern through that surface.

Figure 1:
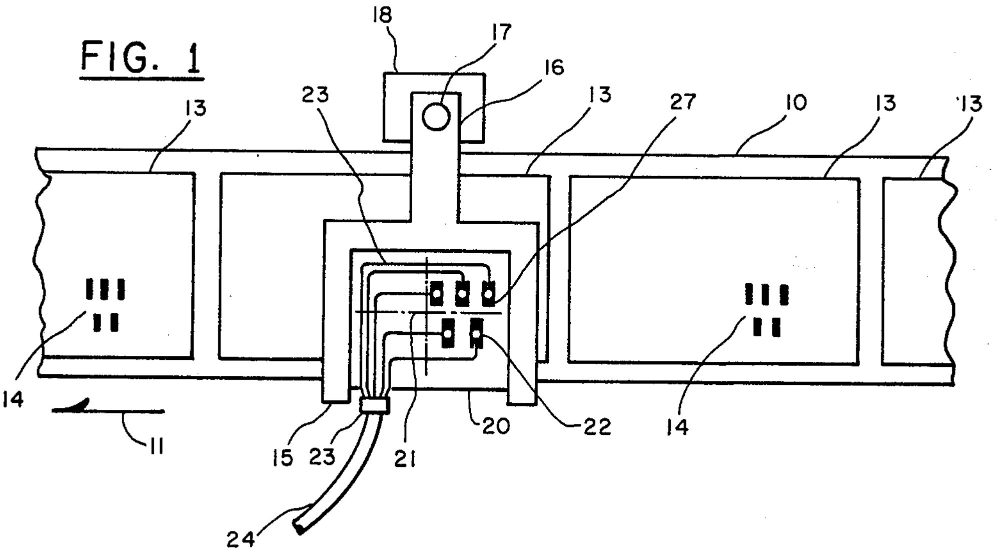

This invention relates to photoelectric reading apparatus and particularly to apparatus for reading optical bar codes.

In many industrial situations it is desirable to read photoelectrically bar codes appearing on objects moving past the code reading apparatus. The code in question may consist, for example, of a pattern of printed line segments, or bars appearing on each object in a color, or shade contrasting with the background. The objects on which the bar code patterns appear may, for example, be paper labels bearing printed product information, as used on bottles containing drugs. The purpose of providing the bar code and of reading it photoelectrically is to permit automatic determination of the correctness of the product information appearing on the labels. In a practical case, such labels may be inspected for correctness before being applied to the drug containers by peeling them, one at a time, off the stack in which they are furnished and passing them serially by the photoelectric code reading apparatus. This apparatus is provided with photoelectric sensing elements, such as photocells, phototransistors or the like, whose outputs vary in accordance with the contrasting code bars and background of the labels passing near the code reading apparatus. These variations in electrical signals are then processed by suitable electronic circuitry to permit the passage of the labels to continue so long as the code pattern representing the correct label is present, while interrupting the process when a code pattern which does not correspond to the correct label is observed.

A variety of problems beset this type of code reading apparatus. Specifically, the spatial relationship between the code reader and the code elements on the labels passing by it is subject to variation, particularly from one type of label to another. Thus, for different sizes of label, the apparatus which peels them off the stack and passes them by the photoelectric code reader, permits passage of these labels at different distances from the photoelectric sensing elements. Likewise, rotation of each label about an axis perpendicular to its surface is possible, and so is lateral displacement transversely to the direction of movement of the label. These changes are all disturbing to the operation of the photoelectric sensing elements and their associated circuitry. For example, changes in the spacing between the code bars printed on the labels and the photoelectric sensing elements interfere with the proper imaging of these code bars on the elements. This adversely affects the electrical outputs from these elements which, in turn, causes errors in the electrical indications produced by the associated circuitry. Rotation of the labels about an axis perpendicular to their surface can cause misalignment between the code bars and the different photoelectric sensing elements to the extent that similar interference with the operation of the overall system occurs. The same is true for lateral displacement of the code bars relative to the direction of motion of the labels.

Problems such as described above become more serious as the sizes of the individual code bars and the spacings between them decrease. For objects such as drug container labels it is often desirable to reduce these sizes and spacings to the point where the over-all system becomes inoperative unless the photoelectric reading apparatus is repositioned relative to the path followed by the labels or other objects bearing the pattern of code bars each time the type of label is changed, and sometimes even from time to time during processing of labels of the same type.

Heretofore this repositioning had to be carried out on the basis of computations involving the theoretical, optical characteristics of the light path linking the field of observation of the code bar pattern to the photosensitive elements of the photoelectric reading apparatus. This was not only very laborious but, in addition, provided no real assurance of success. Moreover, because of this uncertainty, it became impossible to ascertain whether errors in the electrical indications produced by the reading apparatus and its associated circuitry are attributable to the improper positioning of the reading apparatus or to other causes.

It is accordingly a prime object of the invention to provide photoelectric reading apparatus whose position relative to a code pattern to be read by the apparatus can be accurately adjusted without mathematical computations.

It is another object to provide such reading apparatus whose position relative to the code to be read can be visually adjusted.

It is still another object of the invention to provide such code reading apparatus in which the positional adjustment can be carried out at any time without interference with the code reading function of the apparatus.

These and other objects of the invention which will appear are accomplished by constructing the supporting element for the photoelectric sensing elements of a material which is light-transmissive, but has at least one region with light diffusing properties. The effective photoelectrically active portions of the photoelectric sensing elements are positioned in substantially the plane of the above-mentioned light diffusing region, and means are provided for projecting a focused image of the code pattern upon that region.

Figure 2:
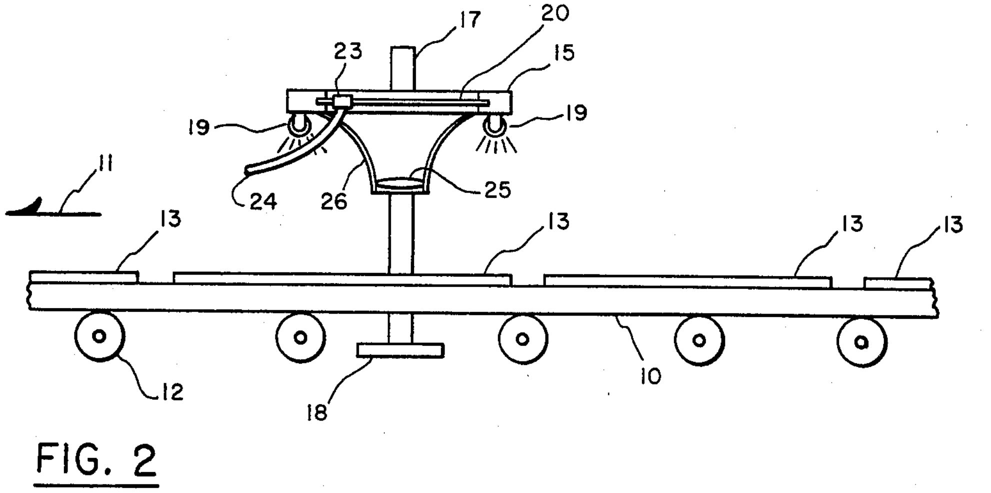

For further details reference may be had to the description which follows in the light of the accompanying drawings wherein FIGURE 1 is a top view of apparatus diagrammatically illustrating this invention, and FIGURE 2 is a side view of the apparatus of FIGURE 1. The same reference numerals denote corresponding elements in the two figures.

The drawings, to which reference may now be had, show a segment of a conveyor 10, moving in the direction of arrows 11 and supported on rollers 12 shown in FIGURE 2. The top surface of the conveyor 10, in turn, supports, one behind the other, the labels 13 bearing the code patterns to be read by the apparatus embodying the instant invention. The code patterns, designated by reference numeral 14, are directly visible on two of the labels 13.

A U-shaped retaining frame 15 is positioned above the path followed by the code areas 14. Frame 15 is supported by an extension 16 which is vertically slidable and horizontally rotatable with respect to a supporting post 17 resting on base 18. Attached to the lower surfaces of the U-shaped support 15 are lamps 19 for illuminating the top surface of the code pattern, preferably at an acute angle, in the event ambient light is insufficient for the purpose.

Retained within support 15, in a plane generally parallel to that of the labels 13, is a plate 20 of material which is light-transmissive and at least one surface of which has such characteristics as to diffuse light striking that surface. Preferably the diffusing surface is that facing the labels 13. Plate 20 may be made of any of a variety of materials, such as frosted glass or plastic, preferably having electrical insulation characteristics and sufficient rigidity so as to be both self-supporting and strong enough to support other things which are attached to it as hereinafter explained. Plate 20 is preferably provided with some reference markings such as crossed hairlines 21.

Attached to plate 20 are the photosensitive elements diagrammatically represented by small circles 22 in FIGURE 1. These photosensitive elements may take any of a number of known forms, such as that of photomultiplies or phototransistors. They are attached to plate 20 in such a way that the effective focal plane of each sensitive element 22 lies substantially in the same plane as the diffusing surface of plate 20. To this end, each element 22 may, for example, be mounted in a small hole provided for that purpose in the appropriate location on plate 20. The electrical connection necessary for the operation of each of these photoelectric sensing elements 22 may be brought out to a common terminal block 23 located near one edge of plate 20. In the drawings these electrical connections are shown as single lines, a representative one of which is designated by reference numeral 23. In practice it will be understood that these may consist of wires or printed circuit conductors. Preferably as many of these connections as practical are located on the surface of plate 20 opposite that having the diffusing characteristics. The reasons for this will be explained hereafter.

A cable 24 may be used to provide further connections from terminal block 23 to the electronic circuitry which cooperates with the photosensitive elements 22. This circuitry may take any of a variety of conventional forms depending on the specific application of the code reading apparatus. For example (it may take the form of the circuitry disclosed in Patent No. 3,152,256, issued Oct. 6, 1964, and assigned to the assignee of the present invention. Since this circuitry may be conventional, and may take a variety of known forms, it is not shown or described further herein. Suffice it to say that this circuitry provides suitable output signals for controlling, in the desired manner, the operation of the system transporting the labels 13. For example, this may involve permitting the movement of labels to continue so long as the pattern of code bars indicates the presence of the desired labels, while interrupting this movement when that condition ceases to exist, thereby permitting the removal of the incorrect label or labels from the conveyor.

Alternatively, diverter mechanisms, of which several conventional forms are also known, may be actuated in response to the signal from the electronic circuitry in order to provide different destination for labels having different code patterns.

A lens 25 mounted in a suitable support 26 is positioned between plate 20 and the labels 13 carried by conveyor 10. By adjustment of the frame and lens assembly vertically with respect to the plane of the labels through sliding of the assembly up and down along post 17, the code bars 14 of the code pattern on the labels may be brought into focus on the diffusing surface of plate 20. If the code bars are small and close together, it is desirable to provide a lens 25 which magnifies the image thus projected on the diffusing surface of the plate 20. The resulting projected, focused images of the code bars on one particular label 13 are shown in FIGURE 1 in their positions coincident with the photosensitive elements 22. One of these code bar images is designated in FIGURE 1 by reference numeral 27.

The reason for magnifying these projected images, particularly when the actual printed code bars are small, is that otherwise these images may fail to fill the photoelectrically active areas of the various photosensitive elements 22. This would result in less than optimum efficiency of utilization of these photosensitive elements.

By utilizing plate 20 with its light-transmissive, diffusing properties and mounting the photosensitive elements in the relationship described to that plate 20, it becomes possible for an operator to make observations and any necessary adjustments to maintain the proper distance between assembly 15, 25, and the particular labels and code patterns being processed. Moreover, by swinging this assembly azimuthally about mounting post 17 it also becomes possible to provide the desired alignment relative to the direction of motion of the code bars. Finally, by sliding plate 20 forward and backward within the channel in which it is mounted in frame 15, the desired adjustment transversely to the path of the code bars can be achieved.

In all of this, the positioning of connecting leads 23 out of the plane of the diffusing surface of plate 20 contributes to making these leads as inconspicuous as possible to the observer, thereby minimizing any possible interference with the visual observation process involved in the adjustments described above.

It will be understood that many variations of the apparatus described above will occur to those skilled in the art without departing from the inventive concept. For example, the structural details of the code reading apparatus may be varied widely. Likewise the type of apparatus used to move the code bearing objects past this photoelectric reading apparatus may vary widely. In fact, in some applications it may even be desirable to move the reading apparatus relative to the code pattern to be read. In such instances, the entire code reading apparatus and its associated electronic circuitry may be appropriately displaced. Alternatively, only the code reading apparatus may be displaced. In that case, the code reading apparatus may utilize, in lieu of the photosensitive elements 22 mounted in plate 20, so-called light pipes, also known as fiber optics light conductors. The light collecting ends of these light pipes or fiber optics light conductors would then be imbedded in plate 20 in positions corresponding to those of the photosensitive elements in FIGURE 1 and generally in the plane of the diffusing surface of that plate. The photosensitive elements themselves would be located remotely from plate 20, each photosensitive element being supplied with light from the corresponding light pipe or pipes having ends embedded in the plate as described above. In such an arrangement use may then be made of the flexibility of the light pipes or fiber optics light conductors to permit movement of the effective focal areas of the photoelectric reading apparatus while the photosensitive elements themselves remain stationary.

It will also be understood that the objects bearing the code patterns to be read need not be flat. Curvature can be accommodated by appropriate curvature of the effective focal areas of the photosensitive elements or compensating distortion introduced by the lens, or a combination of these effects.

In view of the above, I desire the scope of the invention to be limited only by the appended claims.

I claim:

1. Photoelectric code reading apparatus comprising:

a surface upon which the code to be read is imaged, said surface being light transmissive and diffusing and of substantially larger area than the image formed by said code;

and photosensitive means for collecting light only from the selected portions of said surface corresponding to said image, said means being so positioned relative to said surface as to also permit visual observation of said code image on said surface.

2. The apparatus of claim 1 characterized in that said surface consists of a substantially rigid plate, at least one face of said plate having light diffusion properties.

3. The apparatus of claim 1 further comprising means for adjusting the position of said surface relative to the code to be read by said apparatus.

4. The apparatus of claim 1 characterized in that said photosenstive means comprises photosensors embedded in said surface.

5. The apparatus of claim 4 further comprising electrical leads supported by said surface and connected to said photosensors.

6. The apparatus of claim 4 characterized in that said photosensors are phototransistors.

7. Photoelectric code reading apparatus comprising:

light-transmissive means having at least one region with light diffusion properties; photosensitive means; and means for applying to said photosensitive means light falling upon selected portions of said region, said light applying means comprising light pipes having their entrance pupils substantially co-planar with said region with light diffusing properties.

References Cited

UNITED STATES PATENTS 3,195,399 7/1965 F. Jonker ------------ 250—219

RALPH G. NILSON, Primary Examiner

T. N. GRIGSBY, Assistant Examiner

U.S. Cl. X.R.

250—223, 227